Mills & Chichester.
Grain Ventilator.
No. 82,432. Patented Sept. 22, 1868.
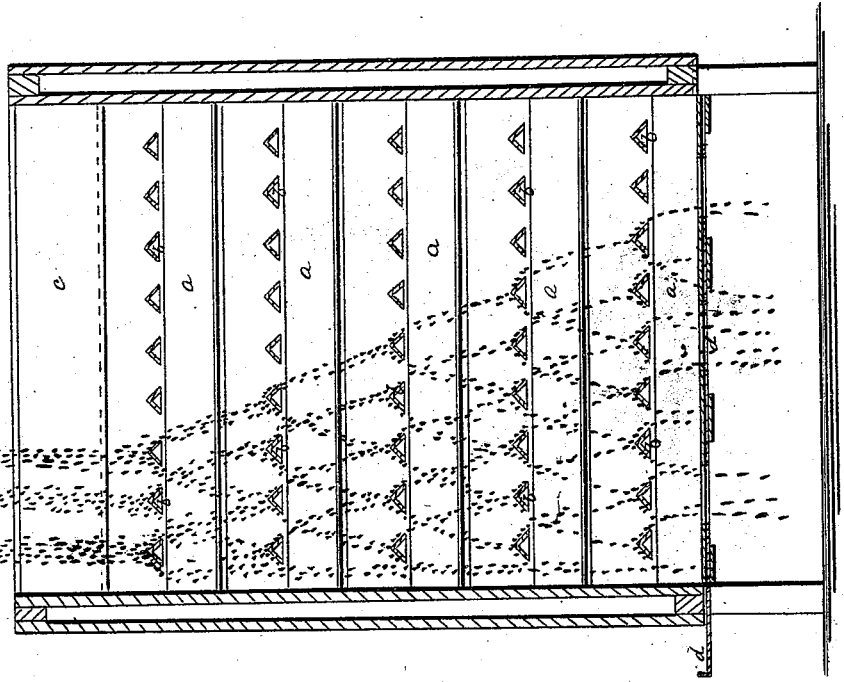
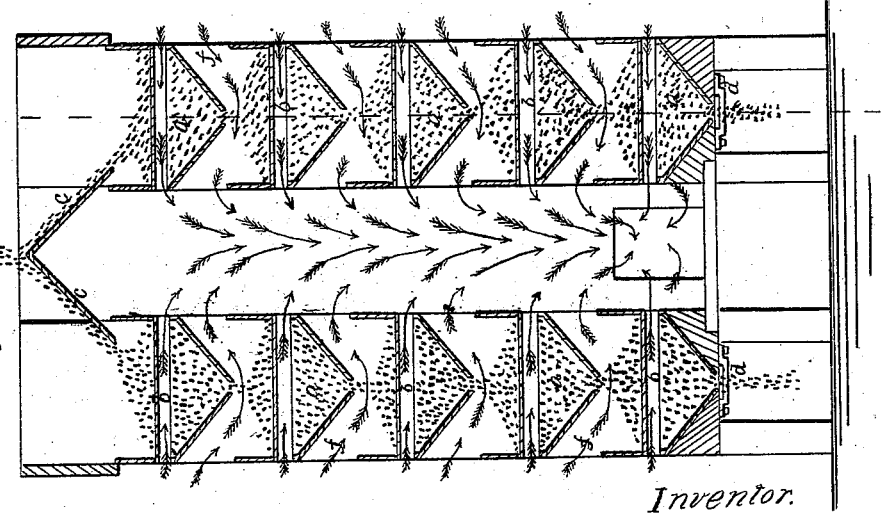

United States Patent Office.

CLARK W. MILLS AND LEWIS S. CHICHESTER, OF BROOKLYN, NEW YORK, ASSIGNORS TO THEMSELVES AND GEORGE H. NICHOLS, OF SAME PLACE.

Letters Patent No. 82,432, dated September 22, 1868; antedated September 10, 1868.

IMPROVEMENT IN GRAIN-DRIERS.

The Schedule referred to in these Letters Patent and making part of the same.

TO ALL WHOM IT MAY CONCERN:

Be it known that we, CLARK W. MILLS and LEWIS S. CHICHESTER, of Brooklyn, in the county of Kings, and State of New York, have invented, made, and applied to use, a certain new and useful Improvement in Grain-Coolers; and we do hereby declare the following to be a full, clear, and exact description of the said invention, reference being had to the annexed drawing, making part of this specification, wherein—

Figure 1 is a vertical section, transversely, of the grain-hoppers, and

Figure 2 is a vertical section, longitudinally, of said hoppers.

Similar marks of reference denote the same parts.

The object of our invention is to expose the grain to a current of air passing over it, and another passing through the grain as it falls, so as to operate upon all the grains for their thorough drying, and for cooling them so as to allow of transportation.

Our invention consists in a series of air-tubes open at their under side, in combination with a hopper delivering the grain in a thin stream upon the top of said tubes, so that air may be drawn or forced through the stratum of grain running from one hopper to the next; and also through such series of air-tubes, over the grain, and conveying away heat or moisture or both. Our invention is especially adapted to the cooling of grain after it has been dried by heat, and previous to shipment, but it may be used as a drier.

In the drawings a a are hoppers, arranged one above the other, and of any suitable length. We have shown two ranges of these hoppers in fig. 1, with an air-space, e, between them, from which the air is exhausted by a suitable fan or blower.

The grain is to be delivered by any suitable elevators on the inclined tables c c, and thence pass into the hoppers a a.

It is preferable to close the slides d at the bottoms of the hopper until the grain accumulates in the apparatus, as shown in fig. 1, and then the grain can be allowed to run out as fast as it is supplied, by opening said slides d.

Across from side to side of the hoppers, we place ranges of half tubes b, that are formed as shown, or semicircular, the open sides being downwards, so as to allow a current of air to draw through the tubes in contact with the surface of the grain, to cool the same thoroughly, and convey away any moisture that may remain in the said grain.

The current of air also draws in through the openings f, and across between the hoppers, passing directly through the thin sheet of grain as it runs from one hopper into the next, and thereby cools the grain by the passing current of air coming into contact with each grain.

The red arrows, in fig. 1, indicate the course in which the air travels, and if it is the ordinary atmosphere, the grain will be cooled, and if heated air is employed, the grain will be dried.

What we claim, and desire to secure by Letters Patent, is—

The series of air-tubes b b, open at their under side, in combination with a hopper delivering the grain upon such series of tubes, in the manner set forth, so that a current of air shall pass through the grain as it falls from said hopper, and through the series of air-tubes, and in contact with such grain, substantially as and for the purposes set forth.

In witness whereof, we have hereunto set our signatures, this eleventh day of February, A. D. 1868.

C. W. MILLS,
LEWIS S. CHICHESTER.

Witnesses:
 GEO D. WALKER,
 CHAS. H. SMITH.